United States Patent
Megiddo

(10) Patent No.: US 10,237,364 B2
(45) Date of Patent: Mar. 19, 2019

(54) RESOURCE USAGE ANONYMIZATION

(71) Applicant: International Business Machines Corporation, Armonk, NY (US)

(72) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 15/079,598

(22) Filed: Mar. 24, 2016

(65) Prior Publication Data

US 2017/0279911 A1    Sep. 28, 2017

(51) Int. Cl.
*H04L 29/08* (2006.01)
*H04L 12/861* (2013.01)

(52) U.S. Cl.
CPC ...... *H04L 67/2814* (2013.01); *H04L 49/9005* (2013.01); *H04L 67/02* (2013.01); *H04L 67/327* (2013.01)

(58) Field of Classification Search
CPC ....... H04L 67/02; H04L 67/28; H04L 9/0894; H04L 63/0281; H04L 67/42; H04L 67/32; H04L 67/1004; H04L 67/2814; H04L 67/2842; H04L 67/2847; H04L 63/08; H04L 63/0414; H04L 63/0421; H04L 63/0823
USPC ........................................ 709/203, 213, 228
See application file for complete search history.

(56) References Cited

U.S. PATENT DOCUMENTS

| | | | | |
|---|---|---|---|---|
| 8,615,562 | B1 * | 12/2013 | Huang | H04L 63/20 709/217 |
| 8,726,343 | B1 * | 5/2014 | Borzycki | G06F 21/6218 726/1 |
| 9,049,102 | B1 * | 6/2015 | Wasserman | H04L 51/12 |
| 9,485,323 | B1 * | 11/2016 | Stickle | H04L 67/32 |

(Continued)

FOREIGN PATENT DOCUMENTS

| | | | |
|---|---|---|---|
| WO | 2006052714 A2 | 5/2006 | |
| WO | WO-2006052714 A2 * | 5/2006 | ............. H04L 67/12 |

OTHER PUBLICATIONS

Boschi et al., "IP Flow Anonymization Support (RFC6235)", An IP.com Prior Art Database Technical Disclosure, Original Publication Date: May 1, 2011, IP.com No. 000206952, 87 pages.

(Continued)

*Primary Examiner* — Ranodhi Serrao
*Assistant Examiner* — James N Fiorillo
(74) *Attorney, Agent, or Firm* — Gilbert Harmon, Jr.

(57) ABSTRACT

One embodiment of a method, executed by one or more processors, includes receiving a request from a client for a network resource, selecting a previously-serviced client as a proxy client, forwarding the request to the proxy client, receiving the network resource from the proxy client, and forwarding the network resource to the client. In another embodiment, the method includes receiving a request from a client for a network resource, selecting a proxy client from a dynamic pool of proxy clients that are each capable of requesting the network resource, and directing the request from the client to the proxy client. The selected proxy client may be the client whose request immediately preceded the current request. A computer system and computer program product corresponding to the method are also disclosed herein.

18 Claims, 6 Drawing Sheets

(56) References Cited

U.S. PATENT DOCUMENTS

| | | | |
|---|---|---|---|
| 2005/0138176 A1* | 6/2005 | Singh | G06F 17/30902 709/226 |
| 2008/0005264 A1* | 1/2008 | Brunell | G06F 21/6254 709/217 |
| 2008/0196098 A1* | 8/2008 | Cottrell | H04L 63/0414 726/12 |
| 2009/0077163 A1* | 3/2009 | Ertugrul | G06Q 30/0273 709/203 |
| 2009/0172801 A1* | 7/2009 | Friedrich | H04L 29/12066 726/12 |
| 2010/0064356 A1* | 3/2010 | Johnston | H04L 63/08 726/5 |
| 2010/0217825 A1 | 8/2010 | Gopalakrishna | |
| 2011/0191445 A1* | 8/2011 | Dazzi | G06F 15/16 709/219 |
| 2012/0084348 A1* | 4/2012 | Lee | G06Q 30/02 709/203 |
| 2012/0144034 A1* | 6/2012 | McCarty | H04L 63/0823 709/225 |
| 2012/0198075 A1* | 8/2012 | Crowe | H04L 67/2847 709/226 |
| 2013/0018978 A1* | 1/2013 | Crowe | H04L 67/2842 709/214 |
| 2014/0351573 A1* | 11/2014 | Martini | H04L 63/0428 713/153 |
| 2014/0359784 A1 | 12/2014 | Taysom et al. | |
| 2014/0379424 A1* | 12/2014 | Shroff | G06Q 30/0204 705/7.31 |
| 2015/0004927 A1* | 1/2015 | Mao | H04W 72/10 455/404.2 |
| 2015/0156172 A1* | 6/2015 | Nandi | G06Q 30/0282 713/153 |
| 2015/0264151 A1* | 9/2015 | Singh | G06F 17/30902 709/203 |
| 2016/0164863 A1* | 6/2016 | Hitchcock | H04L 63/0884 726/10 |

OTHER PUBLICATIONS

Cooper, A., "Report from the Internet Privacy Workshop (RFC6462)", An IP.com Prior Art Database Technical Disclosure, Original Publication Date: Jan. 1, 2012, IP.com No. 000214214, 47 pages.

Mahdian, Mohammad, "Fighting Censorship with Algorithms", Yahoo! Research, Santa Clara, CA, USA, printed on Mar. 9, 2016, 11 pages.

Wu et al., "A Novel Anonymous Communication Model: Coding Mix", Journal of Wuhan University (Natural Science Edition), May 2011, abstract 2 pages, <http://en.cnki.com.cn/Article_en/CJFDTOTAL-WHDY201105007.htm>.

"Exit-Addresses", printed on Mar. 9, 2016, 45 pages, <https://check.torproject.org/exit-addresses>.

"Web Anonymizer", Copyright © 2014 WebAnonymizer.org, 2 pages, <http://webanonymizer.org/>.

Mell et al., "The NIST Definition of Cloud Computing", National Institute of Standards and Technology, U.S. Department of Commerce, Special Publication 800-145, Sep. 2011, 7 pages.

* cited by examiner

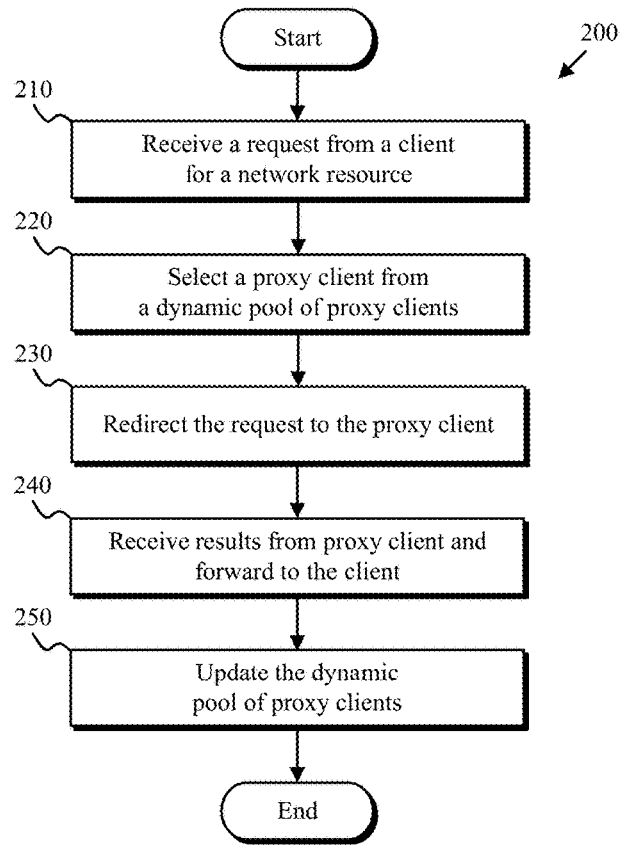

FIG. 2

| Function | Description |
|---|---|
| 310 httpRequest | Sends request network resource R1 to anonymizer |
| 320 receiveRequest | Receives proxy request for network resource R2 from anonymizer |
| 330 receiveCookies | Receives cookie(s) associated with the proxy request for R2 from anonymizer |
| 340 sendCookies | Send the cookie(s) associated with the proxy request to network resource R2 |
| 350 sendResource | Forwards the network resource R2 (e.g., webpage) retrieved with the proxy request |
| 360 httpResponse | Receives requested network resource R1 from anonymizer |

FIG. 3

RESOURCE USAGE ANONYMIZATION

BACKGROUND OF THE INVENTION

The present invention relates generally to the field of accessing network resources, and more particularly to anonymization of network resource requests.

Individuals browsing the World-Wide-Web (the Web), or similar networks, typically request resources via Uniform Resource Locators (URLs). For example, a particular resource may be accessed by opening an HTTP connection to a server having an IP address that corresponds to a Uniform Resource Locator (URL) for the particular resource. The software that implements the request (e.g., a "browser") reveals to the server the IP address from which the connection is made and other possible information such as the location of the user. The disclosure of the IP address, and other information about the requesting user, may compromise the privacy and security of the user.

SUMMARY

As disclosed herein, one embodiment of a method, executed by one or more processors, includes receiving a request from a client for a network resource, selecting a previously-serviced client as a proxy client, forwarding the request to the proxy client, receiving the network resource from the proxy client, and forwarding the network resource to the client. In another embodiment, the method includes receiving a request from a client for a network resource, selecting a proxy client from a dynamic pool of proxy clients that are each capable of requesting the network resource, and directing the request from the client to the proxy client. The selected proxy client may be the client whose request immediately preceded the current request. A computer system and computer program product corresponding to the method are also disclosed herein.

BRIEF DESCRIPTION OF THE DRAWINGS

FIG. 2 is a flowchart depicting one example of an anonymization method in accordance with at least one embodiment of the present invention;

FIG. 3 is a table depicting one example of a client interface for anonymization in accordance with at least one embodiment of the present invention;

DETAILED DESCRIPTION

The embodiments disclosed herein recognize that users may prefer to have their network resource requests anonymized to increase privacy and security but that requests routed through current anonymization services are typically traceable to specific servers. Consequently, the specific servers through which network requests are routed may be discovered over time. As a result, network resource requests that are routed through those conventional anonymization services may be denied. Various embodiments, that address at least some of the above issues, are disclosed herein and will now be described in reference to the Figures.

Figure 1:
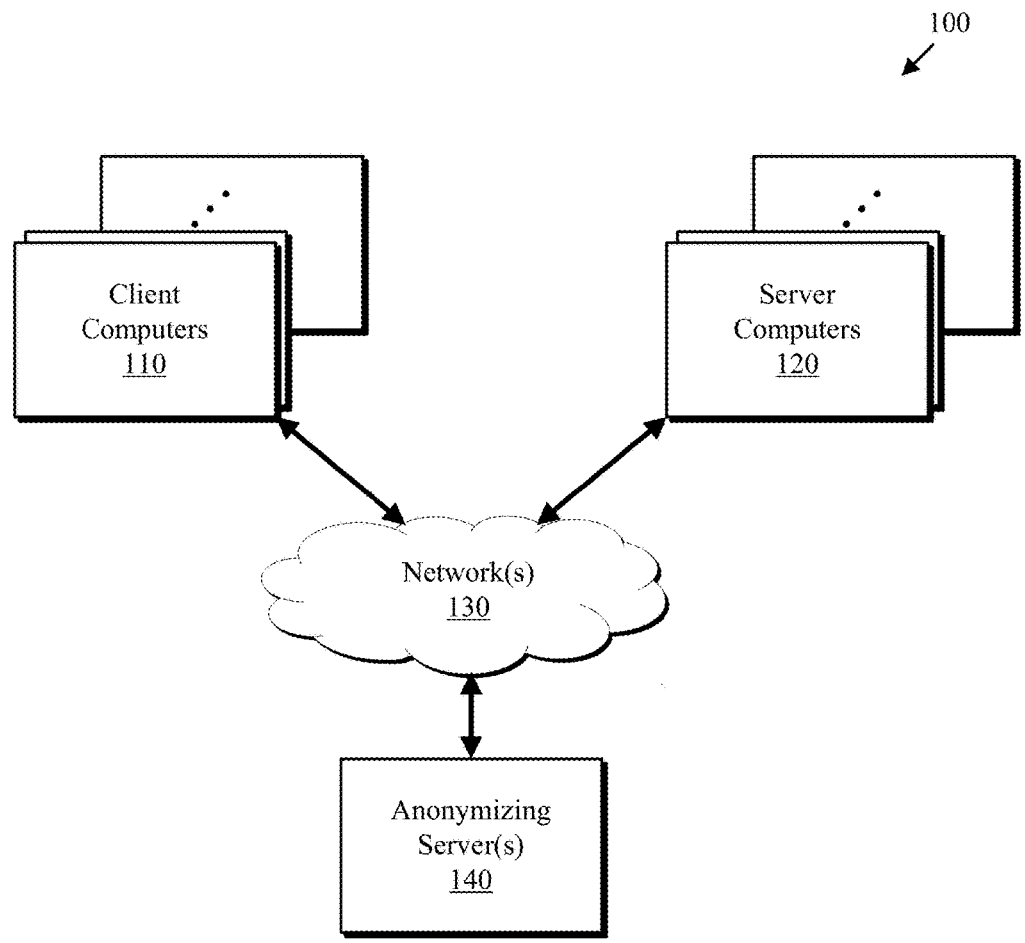
FIG. 1 is a block diagram depicting one example of a computing environment wherein at least one embodiment of the present invention may be deployed.

FIG. 1 is a block diagram depicting one example of a computing environment 100 wherein at least one embodiment of the present invention may be deployed. As depicted, the computing environment 100 includes client computers 110, server computers 120, networks 130, and one or more anonymizing servers 140. The computing environment 100 enables the client computers 110 to access resources and services provided by the server computers 120.

The client computers 110 may be any type of computing device used by a user. Examples include desktop computers, laptop computers and mobile devices such as cell phones and tablets. The server computers 120 provide resources and services to the client computers. The resources or services may be identified via an address or identifier such as a Uniform Resource Locator (URL). For example, the client computers 110 may communicate with the server computers 120 via a connection or transport protocol such as http, ftp, or the like, over the networks 130 to access files or web pages hosted on the server computers 120 that are identified with a URL. The networks 130 may be intra-networks or inter-networks such as the internet.

One issue related to obtaining accessing network resources hosted on the server computers 120 is that the client computers are required to provide their network address (e.g., an IP address) in order to facilitate communication between the server computer 120 that hosts the requested network resource and the client computer 110 that is requesting the network resource. In many cases, the physical location of the client computer 110 and other sensitive information may be obtained from the network address.

In response to this situation, many users elect to direct their network resource requests to an anonymizing server 140. The anonymizing server 140 may request the desired network resource on behalf of the client computer 110 and not disclose the IP address, or other information, specific to the client computer 110.

Another issue that arises from the use of currently available anonymizing services is that the server computers 120 may become aware of the IP addresses associated with the anonymizing servers 140 and deny access to the resources and services that are requested by the anonymizing servers 140. Consequently, the desired anonymization of the client computers 110 may prevent full access to network resources and services provided by many of the server computers 120. The embodiments disclosed herein address at least some of the above issues.

FIG. 2 is a flowchart depicting one example of an anonymization method 200 in accordance with at least one embodiment of the present invention. As depicted, the anonymization method 200 includes receiving (210) a request, selecting (220) a proxy client, redirecting (230) the request, receiving (240) results, and updating (250) the dynamic pool of proxy clients. The anonymization method 200 may be conducted by the anonymizing servers 140 in conjunction with the client computers 110.

Receiving (210) a request may include receiving a request for a network resource from a client (e.g., client computer 110). In some embodiments, the request is an http request that includes a URL. Selecting (220) a proxy client may include selecting a proxy client from a dynamic pool of proxy clients. In some embodiments, the dynamic pool of proxy clients includes clients that have recently requested an anonymization service. For example, a list of clients that have recently requested to use, or have used, a proxy service, may be kept in a buffer. One of skill in the art will appreciate that proxy clients may be selected from the buffer in a variety of ways. For example, proxy clients may be randomly selected from the buffer or an oldest or most recent entry may be selected with each received request. If the most recent entry is used, the buffer may be a single entry memory.

Redirecting (230) the request may include forwarding or otherwise providing the request and any associated information such as a URL (as well as any required cookies) to the selected proxy client. Receiving (240) results may include receiving results of the redirected request from proxy client and forwarding those results to the client. Updating (250) the dynamic pool of proxy clients may include advancing a pointer or updating information such as the client that made the most recent request FIG. 3 is a table depicting one example of a client interface 300 for anonymization in accordance with at least one embodiment of the present invention. As depicted, the client interface 300 includes an httpRequest function 310, a receiveRequest function 320, a receiveCookie function 330, a sendCookie function 340, a sendResource function 350 and an httpResponse function 360. The client interface 300 enables a client to request network resources from an anonymization service and to operate as a proxy client when requested. The functions of the client interface 300 may be provided to, and installed on, the client computers 110 in the form of a set of scripts, or the like.

One of skill in the art will appreciate that the client interface 300 enables users to collectively service each other via an anonymization server. The proxy requests for resources that originate from each client are randomized. Furthermore, the number of users involved, the unpredictability of the pairing of clients and proxy clients, as well as the relatively low frequency of requests generated from each IP address, prevent anonymization detection and the blocking of network resources.

Figure 4:
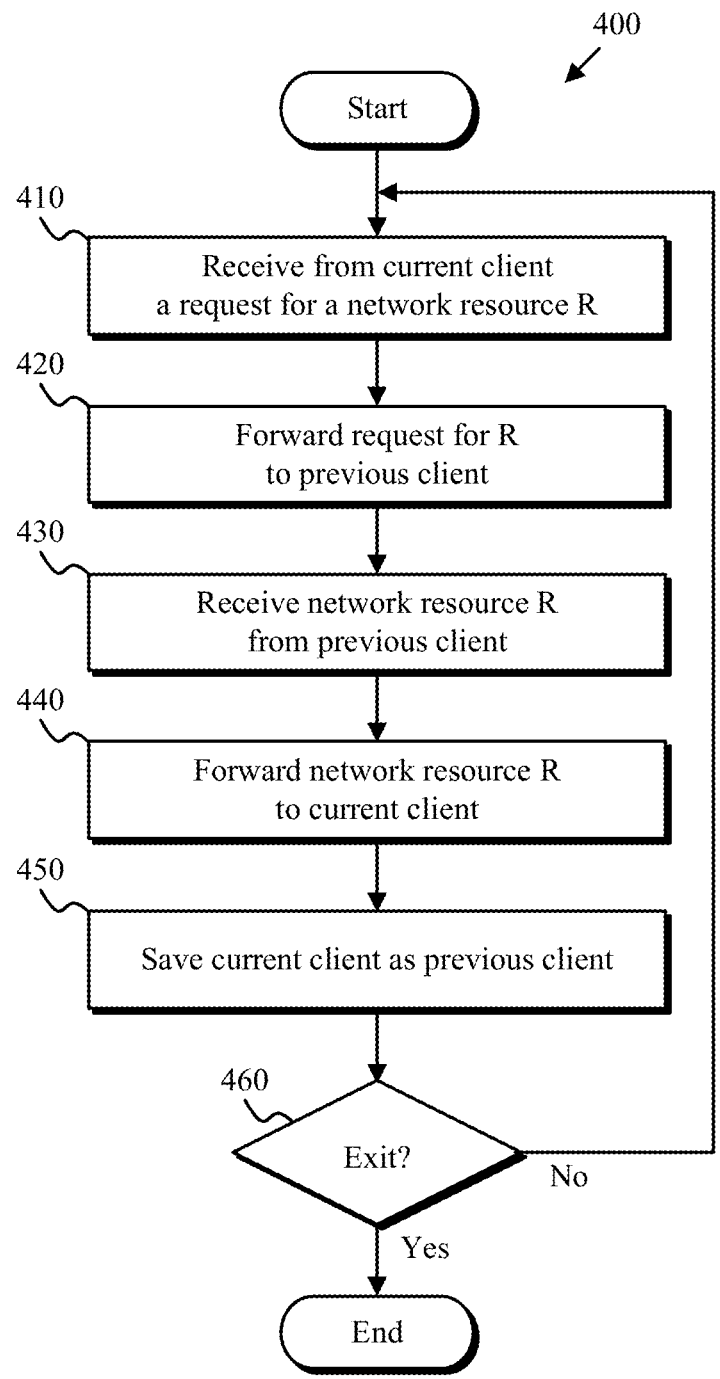
FIG. 4 is a flowchart depicting one example of one particular embodiment of the anonymization method of FIG. 2.

FIG. 4 is a flowchart depicting one example of one particular embodiment of the anonymization method 200 of FIG. 2, namely an anonymization method 400. As depicted, the anonymization method 400 includes receiving (410) a request, forwarding (420) the request, receiving (430) a network resource, forwarding (440) the network resource, saving (450) the current client, and determining (460) whether to exit. The anonymization method 400 is a specific version of the anonymization method 200 and may be conducted by the anonymizing servers 140 in conjunction with the client computers 110.

Receiving (410) a request may be conducted similarly to the receiving operation 210 and includes receiving a request for a network resource from a client (e.g., client computer 110). In some embodiments, the request is an http request that includes a URL.

Forwarding (420) the request may include forwarding or otherwise providing the request and any associated information such as a URL (as well as any required cookies) to a selected client such as the client whose request preceded the current request. For example, the client whose request immediately preceded the current request may be automatically designated as the (next) proxy client.

Receiving (430) a network resource may include receiving a network resource, such as a web page, from the proxy client (e.g., the client whose request immediately preceded the current request). Forwarding (440) the network resource may include forwarding the received network resource to the client. In one embodiment, the proxy client is instructed to send the network resource directly to the client. Having the proxy client send the network resource directly to the client enables skipping operations 430 and 440 of the method 400. Consequently, the processing burden on the anonymization service, or the like, that executes the method 400, may be reduced.

Saving (450) the current client may include saving an identifier for the current client in a memory location that indicates the client whose request preceded the current request and/or indicates the next proxy client.

Determining (460) whether to exit may include determining whether the process corresponding to the method has received a shutdown signal or the like. If no such signal has been received, the method loops to the receiving operation 410. If such a signal has been received, the depicted method terminates.

An anonymizing server that executes the above methods, such as the anonymizing server 140, may receive a continuous stream of requests for network resources and overlap instances of the above methods. For example, an ISP may provide one or more anonymizing servers 140 for use by the customers of the ISP. Thus, when a user at IP address A opens a connection to an anonymizing server 140 and sends a request with respect to a URL U, the anonymizing server 140 may have at least one open connection to an IP address prevA with an unfulfilled request for a URL prevU. The anonymizing server 140 may then ask the client device at node A to open a connection and send the request for prevU. This resource (represented by prevU) is then sent to the anonymizing server 140, and the anonymizing server 140 may forward it to the original requester located at prevA. Subsequently, U becomes prevU, A becomes prevA, and the process is repeated.

One of skill in the art will appreciate that the embodiments disclosed herein do not restrict anonymized (i.e., proxy) requests to a fixed (typically small) set of anonymization servers to access network resources. Rather, the client devices of individual users who seek anonymity are employed to access the resources requested by other such users. The original requests of a particular user are executed by the client devices of different (typically non-repeating) other users. Also, the proxy requests executed by a particular client originate from other (typically non-repeating) users. Thus, tracking the resulting browsing requests does not reveal any information about the actual particular users from whom the requests originate.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
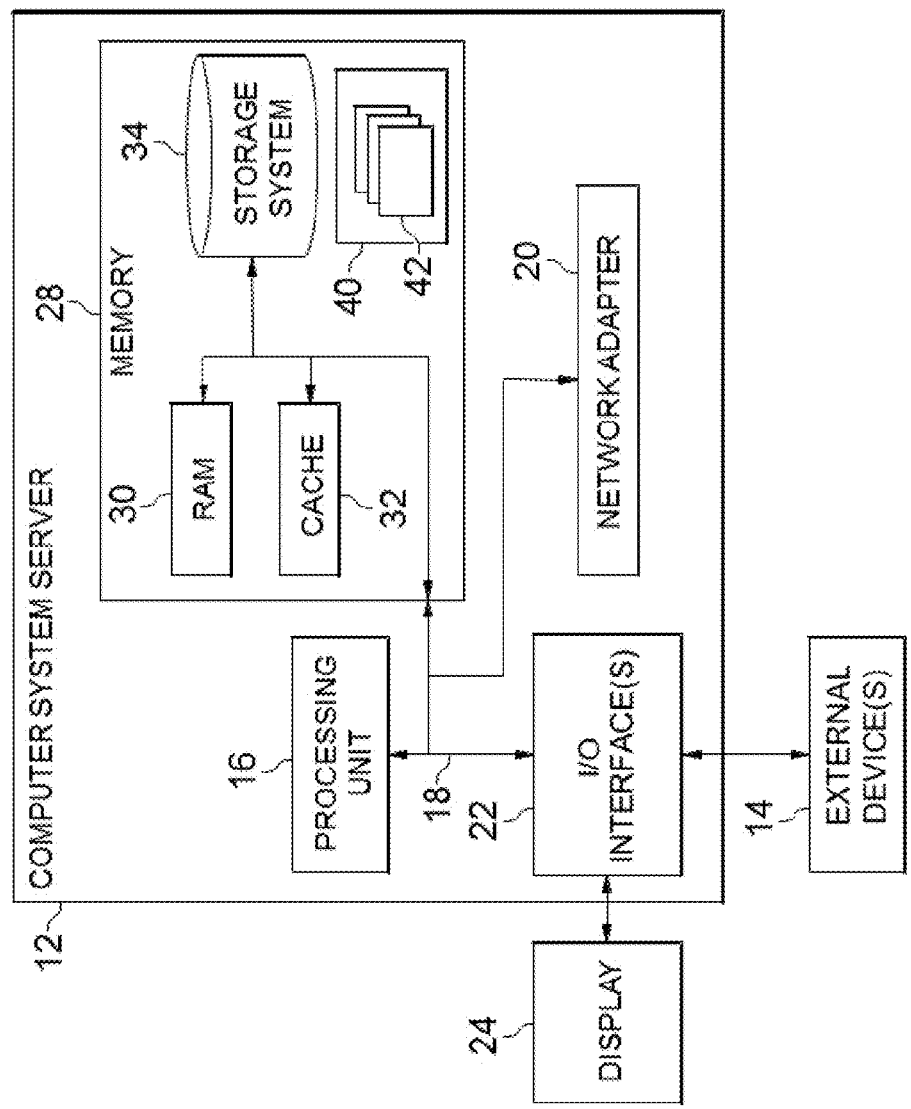
FIG. 5 is a block diagram depicting one example of a computing apparatus (e.g., cloud computing node) suitable for executing the methods disclosed herein.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
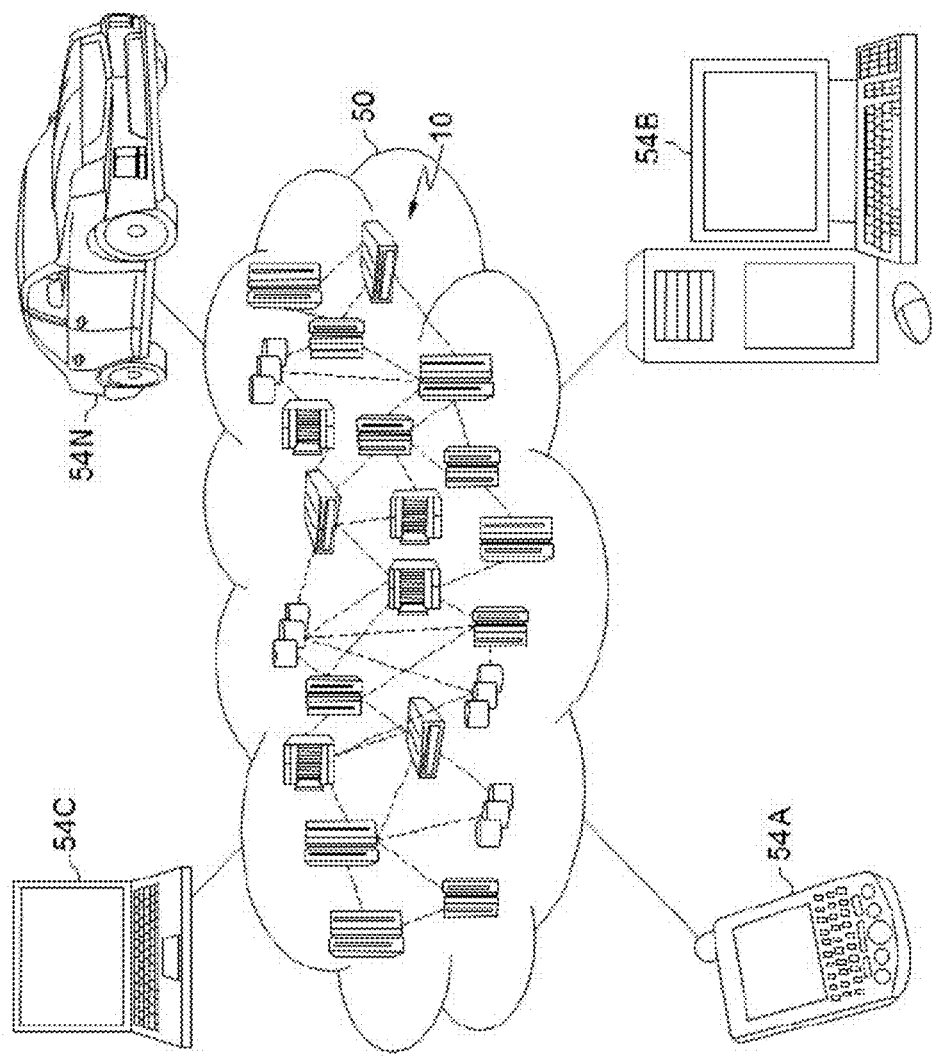
FIG. 6 depicts a cloud computing environment in accordance with to at least one embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
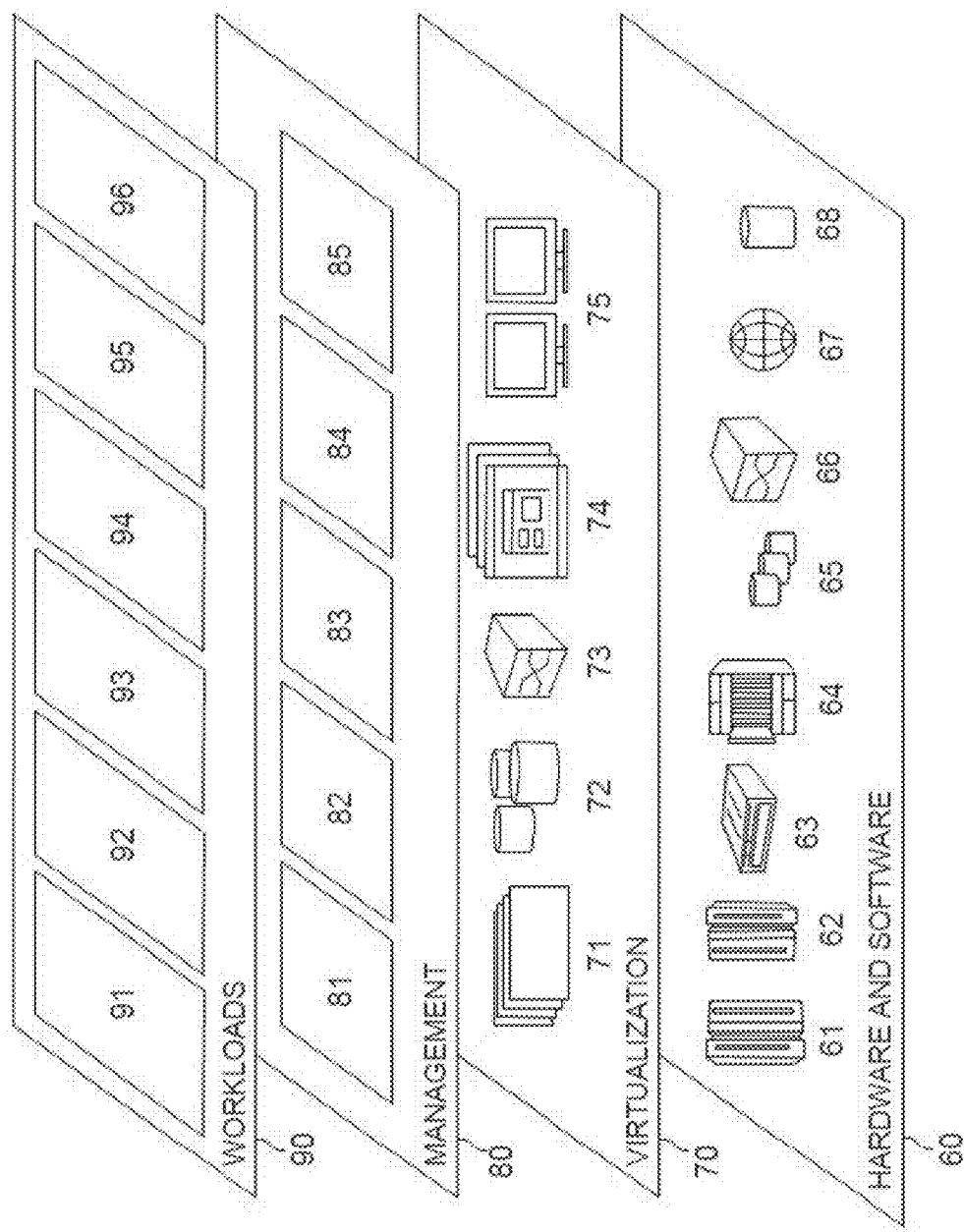
FIG. 7 depicts abstraction model layers in accordance with at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for hiding from the provider the fact that anonymization is being used by enabling users to collectively service each other, executed by one or more processors, the method comprising:
   receiving a request from a current client for a network resource;
   selecting a proxy client, wherein the proxy client is a previous client whose request to use an anonymization service preceded the current request, and the proxy client is randomly selected from a dynamic pool of proxy clients, wherein each client in the dynamic pool of proxy clients is provided an interface in the form of a script to enable the client to request the anonymization service and to operate as a proxy client when requested;
   forwarding the request to the proxy client, wherein the request comprises associated information, wherein the associated information comprises a uniform resource locator and cookies;
   receiving the network resource from the proxy client;
   instructing the proxy client to forward the received network resource to the current client; and
   storing an identifier for the current client on a database for indicating a next proxy client.

2. The method of claim 1, wherein the proxy client is a client whose request immediately preceded the current request.

3. The method of claim 1, further comprising using the client as a subsequent proxy client.

4. The method of claim 1, further comprising using the client as a next proxy client.

5. The method of claim 1, wherein the request comprises a URL.

6. A computer system comprising:
   one or more computer processors;
   one or more computer readable storage media and program instructions stored on the one or more computer readable storage media, the program instructions comprising instructions to perform;
   program instructions to receive a request from a current client for a network resource;
   program instructions to select a proxy client, wherein the proxy client is a previous client whose request to use an anonymization service preceded the current request, and the proxy client is randomly selected from a dynamic pool of proxy clients, wherein each client in the dynamic pool of proxy clients is provided an interface in the form of a script to enable the client to request the anonymization service and to operate as a proxy client when requested;
   program instructions to forwarding the request to the proxy client, wherein the request comprises associated information, wherein the associated information comprises a uniform resource locator and cookies;
   program instructions to receive the network resource from the proxy client;
   instructing the proxy client to forward the received network resource to the current client; and
   program instructions to store an identifier for the current client on a database for indicating a next proxy client.

7. The computer system of claim 6, wherein the proxy client is a client whose request immediately preceded the current request.

8. The computer system of claim 6, wherein the program instructions further comprise instructions for using the client as a subsequent proxy client.

9. The computer system of claim 6, wherein the program instructions further comprise instructions for using the client as a next proxy client.

10. The computer system of claim 6, wherein the request comprises a URL.

11. A method; executed by one or more processors, the method comprising:
  receiving a request from a current client for a network resource;
  selecting a proxy client, wherein the proxy client is a previous client whose request to use an anonymization service preceded the current request, and the proxy client is randomly selected from a dynamic pool of proxy clients, wherein:
    each client in the dynamic pool of proxy clients is provided an interface in the form of a script to enable the client to request the anonymization service and to operate as a proxy client when requested; and
    the dynamic pool of proxy clients corresponds to a buffer or queue;
  forwarding the request to the proxy client wherein the request comprises associated information, wherein the associated information comprises a uniform resource locator and cookies;
  receiving the network resource from the proxy client;
  instructing the proxy client to forward the received network resource to the current client; and
  storing an identifier for the current client on a database for indicating a next proxy client.

12. The method of claim 11, further comprising receiving, from the proxy client, results of a proxy request that corresponds to the request from the client.

13. The method of claim 12, further comprising forwarding, to the client, the results of the proxy request.

14. The method of claim 11, further comprising updating the dynamic pool of proxy clients.

15. The method of claim 11, wherein the dynamic pool of proxy clients consists of clients that have recently requested resources.

16. The method of claim 11, wherein the proxy client is a client that has recently requested resources.

17. The method of claim 11, wherein the proxy client is a client from the dynamic pool of proxy clients, that has most recently made a request.

18. The method of claim 11, wherein a client identifier corresponding to the client is placed into a queue in response to receiving the request from the client or in response to directing the request from the client.

* * * * *